(12) United States Patent
Miyazaki

(10) Patent No.: US 10,088,827 B2
(45) Date of Patent: Oct. 2, 2018

(54) NUMERICAL CONTROL DEVICE ACQUIRING ALARM INFORMATION FROM CONNECTED IO UNIT

(71) Applicant: FANUC Corporation, Minamitsuru-gun, Yamanashi (JP)

(72) Inventor: Yoshito Miyazaki, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 726 days.

(21) Appl. No.: 14/509,112

(22) Filed: Oct. 8, 2014

(65) Prior Publication Data

US 2015/0105874 A1    Apr. 16, 2015

(30) Foreign Application Priority Data

Oct. 16, 2013 (JP) ................................. 2013-215816

(51) Int. Cl.
  *G05B 19/00* (2006.01)
  *G05B 19/406* (2006.01)
  *G05B 15/02* (2006.01)

(52) U.S. Cl.
  CPC ........... *G05B 19/406* (2013.01); *G05B 15/02* (2013.01); *G05B 2219/34465* (2013.01)

(58) Field of Classification Search
  CPC .... G05B 2219/118; G05B 2219/13051; G05B 2219/15032; G05B 2219/21163; G05B 2219/22159; G05B 2219/33094; G05B 2219/34157; G05B 2219/34465; G05B 2219/50265; G05B 2219/41372; G05B 19/058; G05B 19/406; G05B 19/4062;
  (Continued)

(56) References Cited

U.S. PATENT DOCUMENTS 6,430,218 B1    8/2002 Mito
7,032,173 B1 *  4/2006 Sorge ................ G06F 17/30569
                                                707/E17.006
(Continued)

FOREIGN PATENT DOCUMENTS

CN            1811634 A      8/2006
DE      102013206123 A1     10/2013
(Continued)

OTHER PUBLICATIONS

Decision to Grant a Patent issued Sep. 29, 2015 in corresponding Japanese Patent Application No. 2013-215816 (3 pages) with an English Translation (3 pages).
(Continued)

*Primary Examiner* — Christopher E. Everett
(74) *Attorney, Agent, or Firm* — Drinker Biddle & Reath LLP

(57) ABSTRACT

When a communication abnormality detection unit in a numerical control device body detects communication abnormality in IO communication, a command transmission unit transmits a command requesting for making a reply to the numerical control device body with alarm information recorded in a recording unit of each IO unit simultaneously to all the IO units, and only the IO unit where the recording unit records the alarm information makes a reply with the alarm information.

5 Claims, 12 Drawing Sheets

(58) Field of Classification Search
CPC ............ G05B 19/4065; G05B 19/4067; G05B 19/0425; G05B 19/4145; G05B 15/02; H04L 41/0677; B23Q 17/0957; B23Q 17/0961; G01D 5/00
USPC .......... 700/3, 80, 11, 174, 175; 318/41, 565
See application file for complete search history.

(56) References Cited

U.S. PATENT DOCUMENTS

| | | |
|---|---|---|
| 2004/0210339 A1 | 10/2004 | Ogino et al. |
| 2005/0171713 A1* | 8/2005 | Taniguchi .......... G01D 5/24461 702/69 |
| 2006/0181426 A1 | 8/2006 | Ando et al. |
| 2008/0294805 A1* | 11/2008 | Sone .................... G05B 19/058 710/19 |
| 2009/0051367 A1 | 2/2009 | Hada et al. |
| 2013/0265009 A1 | 10/2013 | Janz et al. |
| 2014/0025185 A1 | 1/2014 | Miyazaki et al. |

FOREIGN PATENT DOCUMENTS

| | | | |
|---|---|---|---|
| EP | 1471403 A2 | 10/2004 | |
| JP | 0355856 A1 * | 2/1990 | ............ G06F 13/24 |
| JP | H09-244727 A | 9/1997 | |
| JP | H10-105206 A | 4/1998 | |
| JP | H11-17712 A | 1/1999 | |
| JP | 2009-053734 A | 3/2009 | |
| JP | 2009-223354 A | 10/2009 | |
| JP | 2014-021887 A | 2/2014 | |

OTHER PUBLICATIONS

The Notification of First Office Action dated Jul. 15, 2016 in Chinese Patent Application No. 201410549478X (5 pages) with an English Translation (8 pages).

Office Action dated Jul. 4, 2017 in German Patent Application No. 10 2014 015 034.8 (12 pages) with an English translation (11 pages).

* cited by examiner

US 10,088,827 B2

NUMERICAL CONTROL DEVICE ACQUIRING ALARM INFORMATION FROM CONNECTED IO UNIT

RELATED APPLICATION DATA

This application claims priority under 35 U.S.C. § 119 and/or § 365 to Japanese Application No. 2013-215816 filed Oct. 16, 2013, the entire contents is incorporated herein by reference.

BACKGROUND OF THE INVENTION

1. Field of the Invention

The present invention relates to a numerical control device, and more particularly, to a numerical control device which acquires alarm information from an IO unit connected to the numerical control device.

2. Description of the Related Art

There is a configuration where a plurality of external signal input/output units are connected in order to perform input/output of a DI/DO signal (input signal/output signal) between a numerical control device and a machine tool. Hereinafter, the external signal input/output units are referred to as "IO units". In general, DI/DO data are exchanged between a numerical control device body and the IO unit in the numerical control device. In addition, communication is performed at the same time of exchanging the DI/DO data, and a state of each IO unit such as alarm information is used to examine the cause of occurrence of alarm.

With respect to the communication of the state of the IO unit, JP-A 2009-53734 discloses a method of notifying alarm information of power supply disconnection occurring in IO units connected in a daisy chain to the IO units at the foregoing stages, and a numerical control device which distinguishes communication line disconnection and power supply disconnection of the IO unit and notifies the distinguished communication line disconnection and power supply disconnection to the numerical control device.

FIG. 11 illustrates a configuration of the numerical control device mentioned above. In a numerical control device 1, an IO unit 1 (20a), an IO unit 2 (20b), an IO unit 3 (20c), and an IO unit 4 (20d) are connected to a numerical control device body 10 so that the IO units are connected in a daisy chain. Communication data 40 are transmitted to each IO unit, and as illustrated in FIG. 11, a structure of the communication data 40 is configured to include HEADs, DATA, ALM, and CRC. In addition, feed shaft amplifiers 32 (32a, 32b) are connected to the numerical control device body 10. Each feed shaft amplifier 32 includes a communication control circuit 34 therein. In addition, a feed shaft motor 36 is connected to each feed shaft amplifier 32.

Herein, in a configuration where a master and a plurality of slaves are connected, in general, a DI/DO signal is exchanged periodically between the master and the slaves. When a particular event such as communication abnormality occurs, the master performs read/write of a register inside the slave through command communication which issues a command to the slave. In the command communication, the master and the slave perform one-to-one communication, and the master checks a result of command execution based on a reply from the slave. In this manner, through the command communication, the master can perform initial setting after the power is supplied until the communication abnormality occurs, operation control and collection of information when the abnormality occurs.

In the example illustrated in FIG. 11, the numerical control device body 10 corresponds to the master, and each IO unit 20 (20a, 20b, 20c, and 20d) corresponds to the slave. In the communication between the numerical control device body 10 and each IO unit 20, when the numerical control device body 10 detects the communication abnormality, the alarm information is exchanged between the IO units. Finally, through the command communication, the numerical control device body 10 acquires the alarm information from the IO unit 1 (20a) directly connected to the numerical control device body 10. The numerical control device body 10 specifies a true factor causing the communication abnormality, that is, specifies which abnormality among power supply disconnection, communication line disconnection and the like occurs in an IO unit 20 based on the alarm information acquired from the IO unit 1 (20a), so that it is possible to perform countermeasures such as stopping an amplifier or a motor according to a content of the abnormality.

The numerical control device disclosed in JP-A 2009-53734 needs to acquire the alarm information one by one in the order from the IO unit near to the numerical control device in order to detect the alarm information such as power supply disconnection occurring in the IO units connected in a daisy chain. Therefore, a considerable time may be taken to specify the true factor causing the communication abnormality.

Herein, in the IO units connected in a daisy chain, in a case where the abnormality caused by the power supply disconnection or the communication line disconnection occurs, it may be necessary to immediately stop the operation of the numerical control device, since normal operations are not guaranteed in the IO units at the following stages of the site where the abnormality occurs. However, in some cases, in order to immediately stop the operation of the numerical control device, it may not be possible to secure a sufficient time for the numerical control device body to acquire the alarm information from the IO unit where the communication abnormality occurs.

SUMMARY OF THE INVENTION

An object of the present invention is to provide a numerical control device capable of speedily acquiring alarm information according to power supply disconnection or the like occurring in a connected IO unit in the numerical control device and capable of immediately stopping an operation of an amplifier, a motor, or the like.

According to an aspect of the present invention, there is provided a numerical control device which has a numerical control device body and a plurality of IO units connected in a daisy chain and configured to perform IO communication between the numerical control device body and the IO units, and the numerical control device body comprising: a communication abnormality detection unit configured to detect communication abnormality occurring in the IO communication; a command transmission unit configured to transmit a command simultaneously to all the IO units; an alarm acquisition unit, and, each of the IO units comprising: a status abnormality detection unit configured to detect at least one of incorrect data reception in the IO communication, power supply disconnection, communication line disconnection to the numerical control device body or another IO unit, and circuit abnormality of the IO unit itself as status abnormality; a recording unit configured to record the status abnormality detected by the status abnormality detection unit as alarm information; a command reply unit configured to make a reply with the alarm information with respect to the command from the numerical control device body, and, the command transmission unit is configured to transmit a command requesting for making a reply to the numerical control device body with the alarm information recorded in the recording unit of each IO unit simultaneously to all the IO units when the communication abnormality detection unit detects the communication abnormality in the IO communication, and, among the IO units, only the IO unit where the recording unit records the alarm information makes a reply with the alarm information, and the alarm acquisition unit of the numerical control device body acquires the alarm information replied from the IO unit, when the command is transmitted simultaneously.

Herein, when the numerical control device body acquires the alarm information of the IO unit, the numerical control device body transmits the command indicating that only the IO unit satisfying the condition makes a reply to the numerical control device body with the alarm information simultaneously to all the IO units. It is possible to specify the IC unit which satisfies the condition according to the reply. In addition, it is possible to acquire the alarm information included in the IO unit by using a content of the reply. Herein, the alarm information of the communication abnormality is set as the condition, so that it is possible to perform specifying the IO unit where the communication abnormality occurs and acquiring the alarm information through one-time communication, and it is possible to shorten the time taken to acquire the alarm information. Accordingly, it is possible to acquire the necessary alarm information from the IO unit after the communication abnormality occurs in the IO unit until the numerical control device stops the operation.

The IO unit may be configured to include a storage unit configured to store a determination criterion for determining whether or not to record the detected status abnormality as the alarm information.

Accordingly, the IO unit is configured to include the storage unit which stores the determination criterion for determining whether or not to record the status abnormality as the alarm information, so that it is possible to make a reply to the numerical control device body with the status information selected from pieces of the detected status information.

According to another aspect of the present invention, there is provided a numerical control device which has a numerical control device body and a plurality of IO units which are connected in a daisy chain and which performs control of a machine, and the numerical control device body comprising: a machine abnormality detection unit configured to detect abnormality occurring in the machine; a command transmission unit configured to transmit a command simultaneously to all the IO units, and each of the IO units comprising: an information acquisition unit configured to acquire alarm information when the abnormality of the machine is detected; a recording unit configured to record the alarm information acquired by the information acquisition unit as the alarm information of the machine; a command reply unit configured to make a reply with the alarm information with respect to the command from the numerical control device body, and, the command transmission unit is configured to transmit a command requesting for making a reply to the numerical control device body with the alarm information recorded in the recording unit of each IO unit simultaneously to all the IO units, when the machine abnormality detection unit detects the abnormality of the machine, and, among the IO units, only the IO unit where the recording unit records the alarm information of the machine is configured to make a reply with the alarm information, and the alarm acquisition unit of the numerical control device body is configured to acquire the alarm information replied from the IO unit, when the command is transmitted simultaneously.

Accordingly, since only the IO unit which records the alarm information of the machine is allowed to make a reply to the numerical control device body with the alarm information, so that it is possible to specify occurrence of the abnormality of the machine. Accordingly, the information of the IO unit is acquired until the power supply of the numerical control device body is completely disconnected, so that it is possible to immediately stop an operation of an amplifier or a motor and to repair the machine based on the information of the IO unit.

The numerical control device body may include a setting unit configured to set the IO unit configured to acquires the alarm information of the machine.

Accordingly, the numerical control device body is allowed to set the IO unit which acquires the alarm information of the machine, so that it is possible to securely specify occurrence of the abnormality of the machine.

According to still another aspect of the present invention, there is provided a numerical control device which has a numerical control device body and a plurality of IO units which are connected in a daisy chain and which performs control of a machine, the numerical control device body is configured to include: a command transmission unit configured to transmit a command simultaneously to all the IO units; a command reception unit configured to receive a command reply from the IO unit with respect to the command, and each of the IO units comprising: an execution unit configured to execute the command with respect to the command from the numerical control device body; a command reply unit configured to make a reply with respect to the command; a setting unit configured to set whether or not to make a reply with respect to the command, and the command transmission unit is configured to transmit a command requesting for executing at least one or more of turning DOs of the IO unit ON or OFF, turning alarm of the IO unit OFF, and acquiring position information of a motor controlled by the numerical control device body simultaneously to all the IO units, and, among the IO units, only the IO unit which is set by the setting unit in advance is configured to make a reply with respect to the command, and the command reception unit of the numerical control device body is configured to receive a command reply from the IO unit, when the command is transmitted simultaneously.

According to the present invention having the above-described configuration, it is possible to provide a numerical control device capable of acquiring alarm information according to power supply disconnection or the like occurring in a connected IO unit in the numerical control device and capable of immediately stopping an operation of an amplifier, a motor, or the like.

BRIEF DESCRIPTION OF THE DRAWINGS

Objects and features of the present invention and others will be clarified from the following description of embodiments with reference to the attached drawings.

DETAILED DESCRIPTION OF THE PREFERRED EMBODIMENTS

First Embodiment

Figure 1:
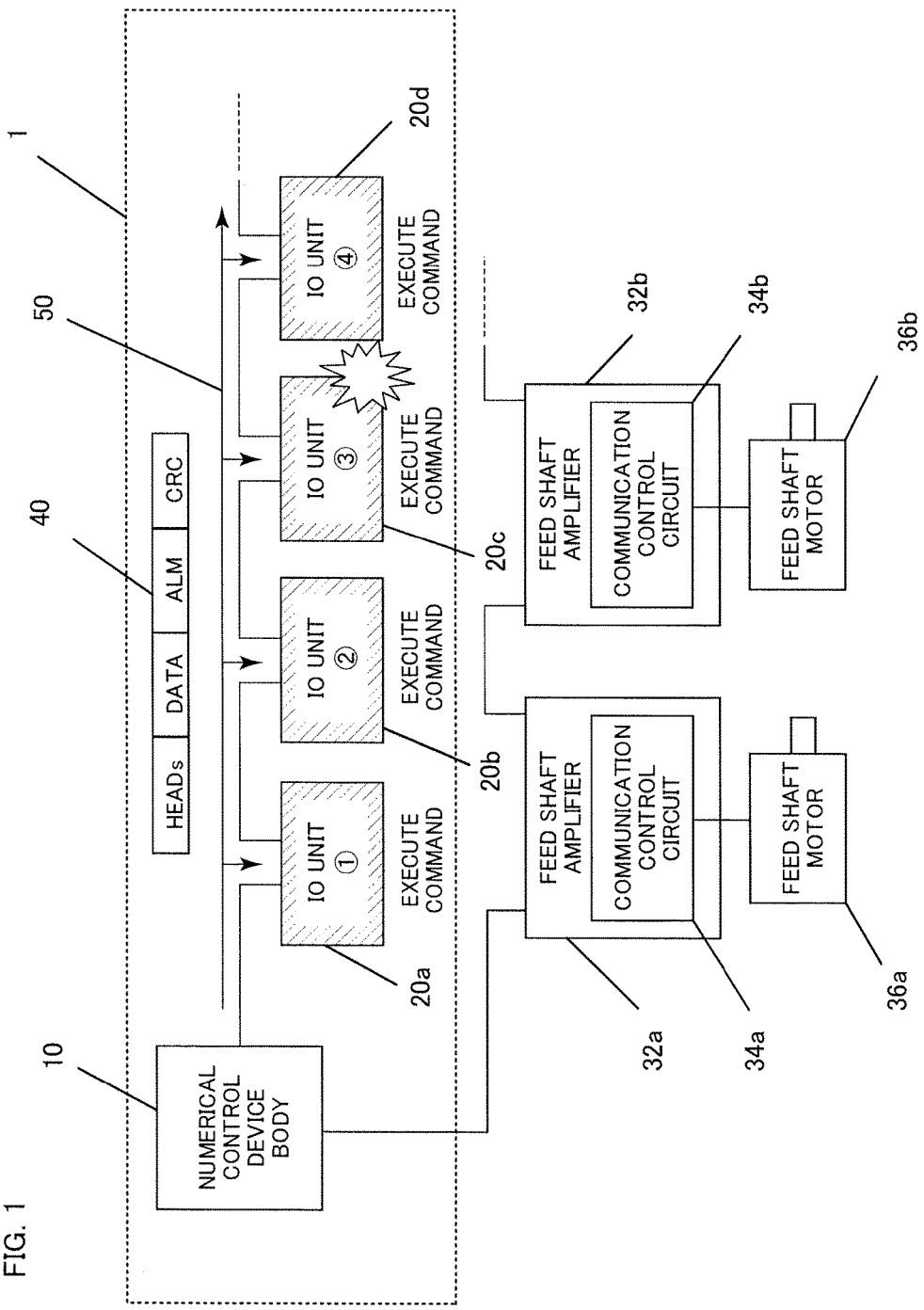
FIG. 1 is a diagram illustrating a configuration of a numerical control device according to a first embodiment and a state where a numerical control device body transmits a command simultaneously.
Figure 11:
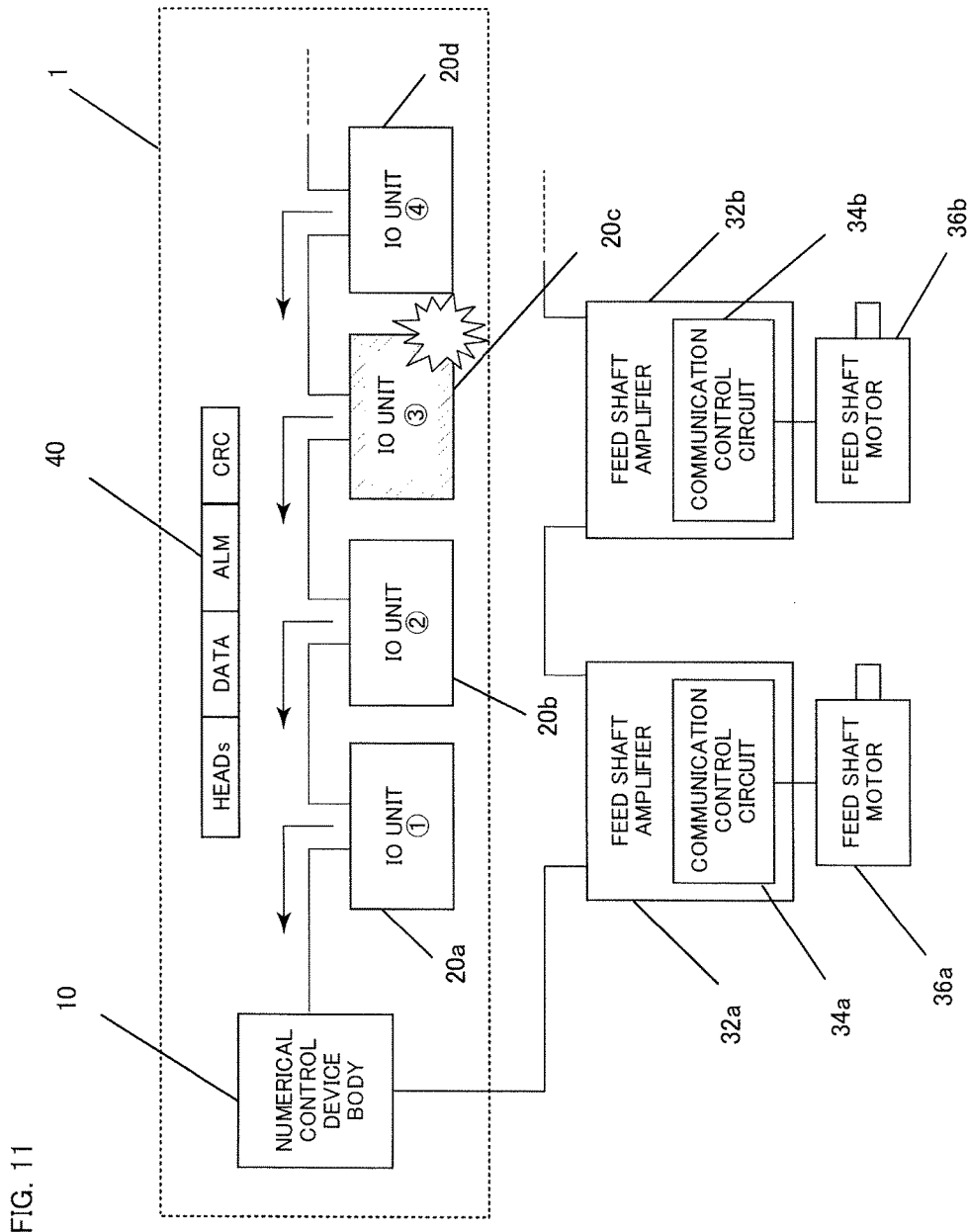
FIG. 11 is a diagram illustrating a configuration of a numerical control device in the related art.

FIG. 1 is a diagram illustrating a configuration of a numerical control device according to a first embodiment. The numerical control device is different from that of FIG. 11 of the related art in that the numerical control device has a function of transmitting a command from a numerical control device body 10 simultaneously to all IO units 20.

In communication between the numerical control device body 10 in the normal operation and each IO unit 20, the numerical control device body 10 monitors whether or not abnormality occurs in communication data 40 communicated with the IO unit 1 (20a). As an example, there are information as to whether or not there are incorrect data in header/footer/error detection code or the like included in the communication data 40 such as CRC, information as to whether or not the IO unit 1 (20a) makes a reply to the numerical control device body 10 within a predetermined time interval with respect to the data transmission from the numerical control device body 10, and the like. In a case where such abnormality occurs at predetermined times or frequency, the numerical control device body 10 detects that communication abnormality occurs.

On the other hand, each IO unit 20 detects various statuses as status information, and constantly monitors the statuses. As an example of the status information, there are an idle pattern signal input such as a toggle pattern having a predetermined period to each IO unit 20 itself, a power supply voltage, header/footer/error detection code (CRC) of the received communication data 40, and a data reception interval from the numerical control device body 10. Such detection results are retained in a register inside each IO unit 20.

Figure 2:
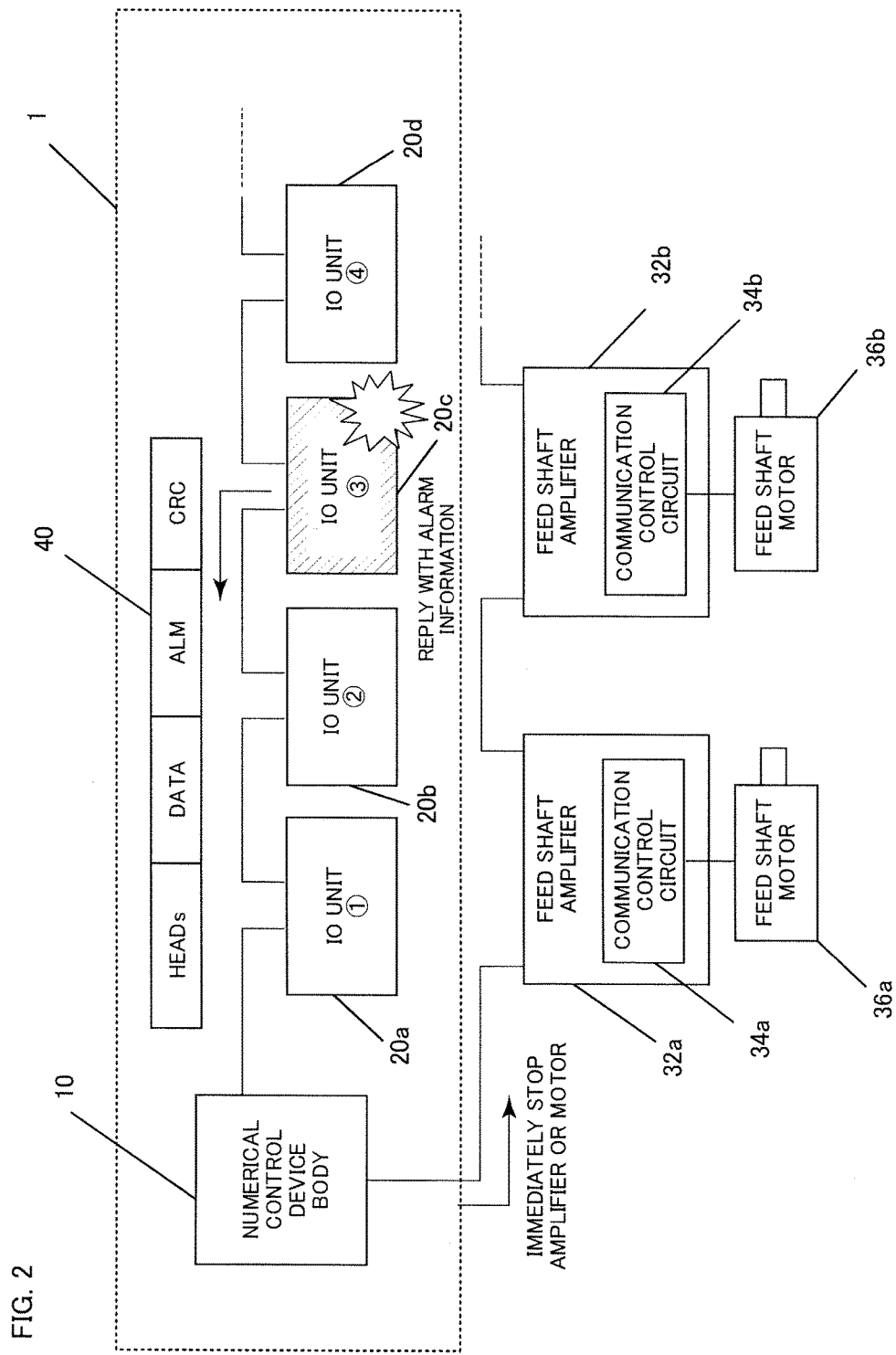
FIG. 2 is a diagram illustrating a state where an IO unit where alarm occurs makes a reply to the numerical control device body in the first embodiment.

Herein, in the embodiment, if the numerical control device body 10 detects the communication abnormality in the communication data from the IO unit 1 (20a), as conceptually illustrated in FIGS. 1 and 2, the numerical control device body 10 transmits an alarm search command 50 simultaneously to all the IO units 20.

If each IO unit 20 receives the alarm search command 50, each IO unit 20 executes the command simultaneously to check the status retained in the register inside each IO unit 20. At this time, since only the IO unit 20 where some abnormality occurs retains information on the abnormality in the register 60 inside the IO unit 20, only the IO unit 20 directly makes a reply to the numerical control device body 10 with alarm information. In the example illustrated in FIG. 2, since the register 60 inside the IO unit 3 (20c) retains the information on the communication abnormality, the other IO units do not make a reply to the numerical control device body 10, but only the associated IO unit 3 (20c) makes a reply to the numerical control device body 10. The numerical control device body 10 which receives the alarm information transmits a stop signal to a feed shaft amplifier 32a in order to immediately stop an amplifier or a motor.

Figure 3:
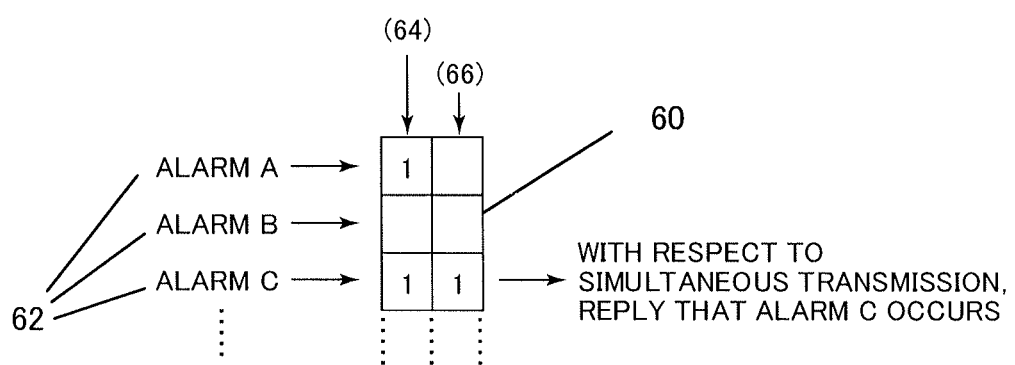
FIG. 3 is a diagram illustrating setting of a register inside each IO unit.

Next, a method of setting the register 60 of each IO unit 20 and the alarm information with which each IO unit 20 makes a reply to the numerical control device body 10 will be described. FIG. 3 is a diagram illustrating setting of the register 60 inside each IO unit 20. As illustrated in FIG. 3, each IO unit 20 includes a plurality of alarm information registers 62 (alarm A, alarm B, alarm C, . . . ) in the register 60 inside the IO unit 20. As described above, as an example of the alarm information register 62, there are monitoring results for various statuses such as an idle pattern signal input such as a toggle pattern having a predetermined period to each IO unit 20 itself, a power supply voltage, header/footer/error detection code of the received communication data 40 such as CRC, a data reception interval from the numerical control device body 10, and the like. In addition, each alarm information register 62 includes an enable bit 64 which is set to valid/invalid.

In addition, each alarm information register 62 also includes an alarm bit 66, and when abnormality corresponding to each alarm information register 62 occurs, the bit is set so as to be 1. Therefore, in each alarm information register 62, it is set by the value of the enable bit 64 whether or not the transmission of the alarm information is to be performed, and the abnormality corresponding to each alarm information register 62 occurs, so that the alarm bit is set to 1. Accordingly, in a case where both of the values of the enable bit 64 and the alarm bit 66 are set to 1, it is determined whether or not each IO unit 20 makes a reply with respect to the alarm search command 50 from the numerical control device body 10.

Accordingly, in each alarm information register 62, the enable bit 64 is set to valid/invalid in advance, so that it is possible to select the alarm information register 62 which becomes the object of a reply which each IO unit 20 makes with respect to the alarm search command 50. Using the setting of the alarm information register 62, even when the abnormality is detected in the IO unit 20 so that the alarm bit is set to 1, the detected alarm bit 66 is intentionally ignored in an IO unit so that it is possible to set the IO unit 20 not to make a reply with respect to the alarm search command 50.

The numerical control device body 10 can specify the IO unit 20 where abnormality occurs based on the information replied from the IO unit 20. Accordingly, it is possible to shorten the time taken to specify the communication abnormality compared to the case of acquiring the alarm information sequentially through one-to-one communication with each IO unit 20. Therefore, even in a case where a sufficient time taken to acquire the alarm information from the IO unit 20 cannot be secured through the one-to-one communication, it is possible to immediately stop the operation of the amplifier or the motor by acquiring the alarm information.

Figure 4:
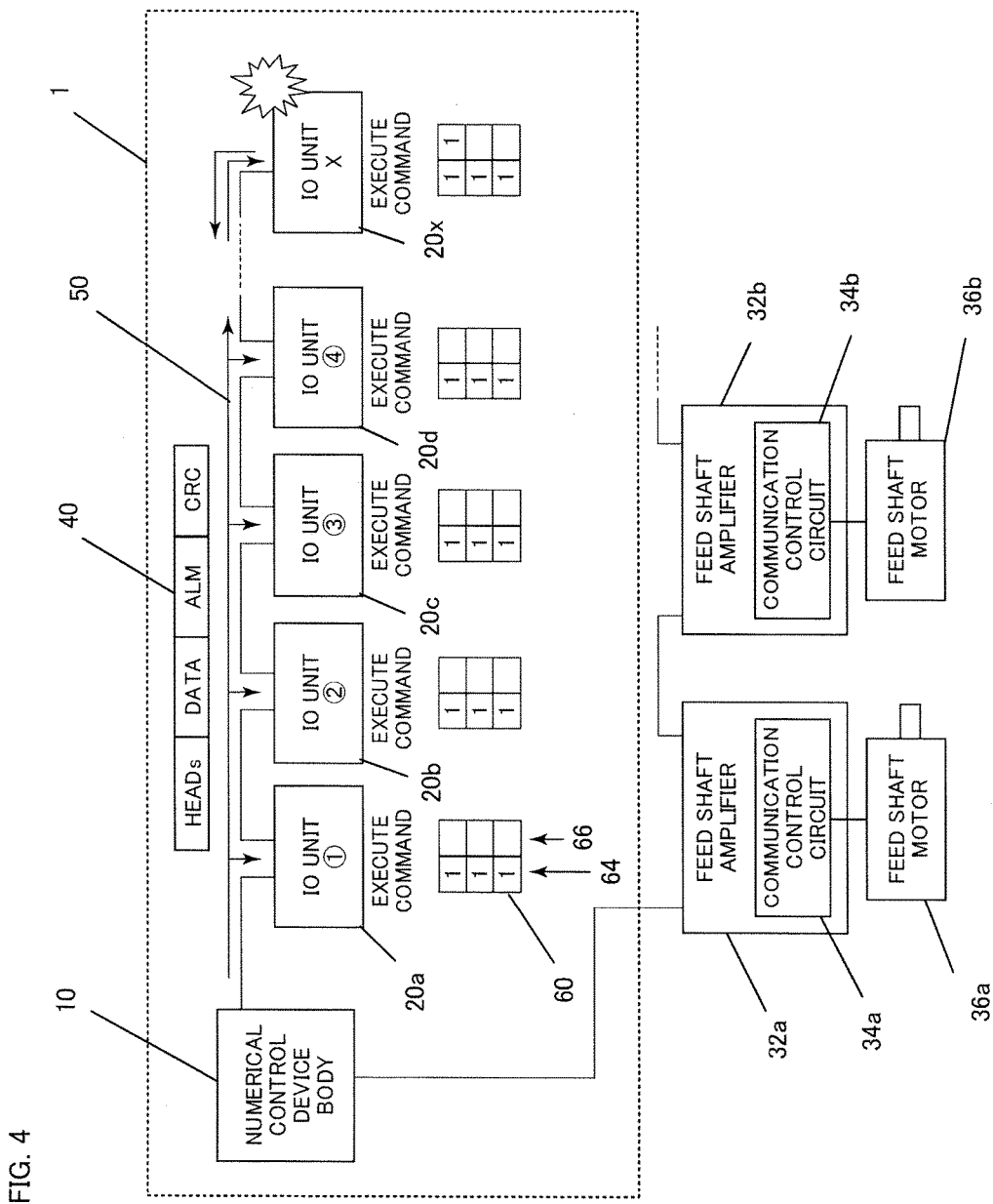
FIG. 4 is a diagram illustrating execution of a command and a behavior of a register in each IO unit when the numerical control device body transmits an alarm search command simultaneously.

FIG. 4 illustrates execution of a command and a behavior of the register 60 at this time in each IO unit 20 when the numerical control device body 10 transmits the alarm search command 50 simultaneously. In FIG. 4, since the enable bit 64 is set to 1 and the alarm bit 66 is set to 1 in the alarm information register 62 of the X-th IO unit X, the IO unit X makes a reply to the numerical control device body 10.

Figure 5A:
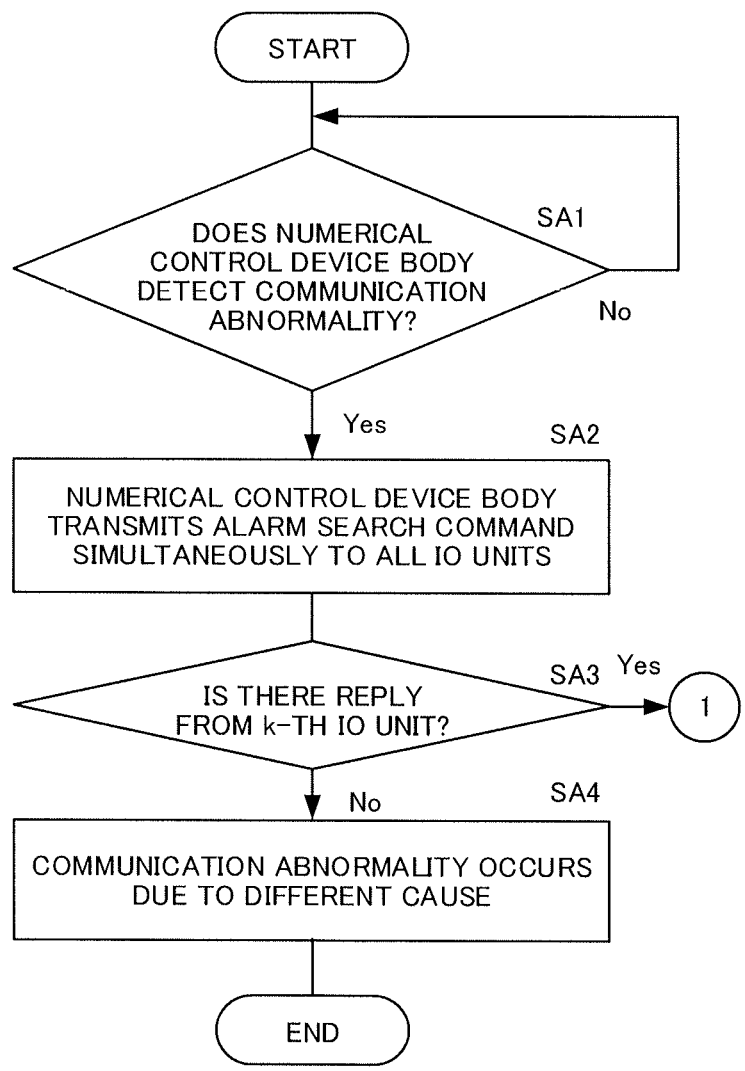
FIG. 5A is a flowchart (first part thereof) illustrating a flow of detection of abnormality and reply with alarm information in the first embodiment.
Figure 5B:
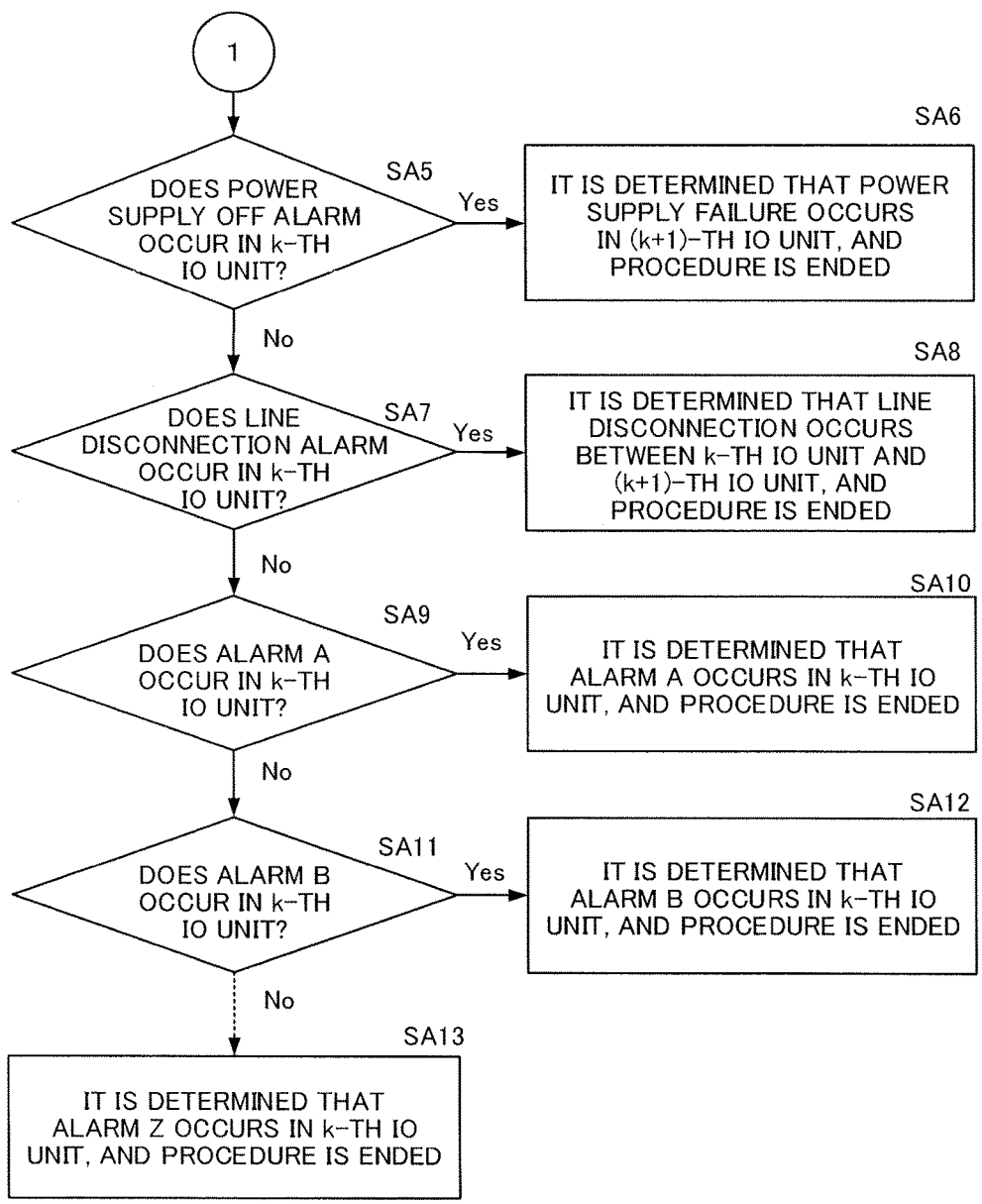
FIG. 5B is a flowchart (second part thereof) illustrating the flow of detection of abnormality and reply of alarm information in the first embodiment.

FIGS. 5A and B is a flowchart illustrating a flow of detection of abnormality and reply with alarm information in the embodiment. Hereinafter, each step will be described.

(step SA1) It is determined whether or not the numerical control device body detects the communication abnormality. In a case where the abnormality is detected (Yes), the procedure proceeds to step SA2; and in a case where the abnormality is not detected (No), the procedure repeats step SA1 until the abnormality is detected.

(step SA2) The numerical control device body transmits the alarm search command to all the IO units simultaneously.

(step SA3) It is determined whether or not there is a reply from a k-th IO unit. In a case where there is a reply (Yes), the procedure proceeds to step SA5; and in a case where there is no reply (No), the procedure proceeds to step SA4.

(step SA4) It is determined that the communication abnormality occurs due to another cause, and the procedure is ended.

(step SA5) It is determined whether or not power supply OFF alarm occurs in the k-th IO unit. In a case where the alarm occurs (Yes), the procedure proceeds to step SA6; and in a case where the alarm does not occur (No), the procedure proceeds to step SA7.

(step SA6) It is determined that the power supply failure occurs in the (k+1)-th IO unit, and the procedure is ended.

(step SA7) It is determined whether or not line disconnection alarm occurs in the k-th IO unit. In a case where the alarm occurs (Yes), the procedure proceeds to step SA8; and in a case where the alarm does not occur (No), the procedure proceeds to step SA9.

(step SA8) It is determined that the line disconnection occurs between the k-th IO unit and the (k+1)-th IO unit, and the procedure is ended.

(step SA9) It is determined whether or not alarm A occurs in the k-th IO unit. In a case where the alarm occurs (Yes), the procedure proceeds to step SA10; and in a case where the alarm does not occur (No), the procedure proceeds to step SA11.

(step SA10) It is determined that the alarm A occurs in the k-th IO unit, and the procedure is ended.

(step SA11) It is determined whether or not alarm B occurs in the k-th IO unit. In a case where the alarm occurs (Yes), the procedure proceeds to step SA12; and in a case where the alarm does not occur (No), the procedure proceeds to step SA13.

(step SA12) It is determined that the alarm B occurs in the k-th IO unit, and the procedure is ended.

Hereinafter, the same determination is repeated to determine whether or not some alarm occurs. In a case where any alarm determination is not satisfied, finally, the procedure proceeds to step SA13.

(step SA13) It is determined that alarm Z occurs in the k-th IO unit, and the procedure is ended.

Second Embodiment

In the first embodiment, when the communication abnormality occurs in the communication between the numerical control device body 10 and the IO unit 20, the numerical control device body 10 transmits the alarm search command 50 simultaneously. However, with respect to the occurrence of abnormality, besides the communication abnormality between the numerical control device body 10 and the IO unit 20, in some cases, abnormality may occurs in a machine side which is controlled by the numerical control device 1.

Even in this case, if the abnormality occurs in the machine side, the power supply of the numerical control device body 10 may be disconnected. Therefore, when abnormality occurs in the machine, if the power supply of the numerical control device body 10 is immediately disconnected, in some cases, it may not be possible to secure a time taken for the numerical control device body 10 to acquire the alarm information of the machine.

Figure 6:
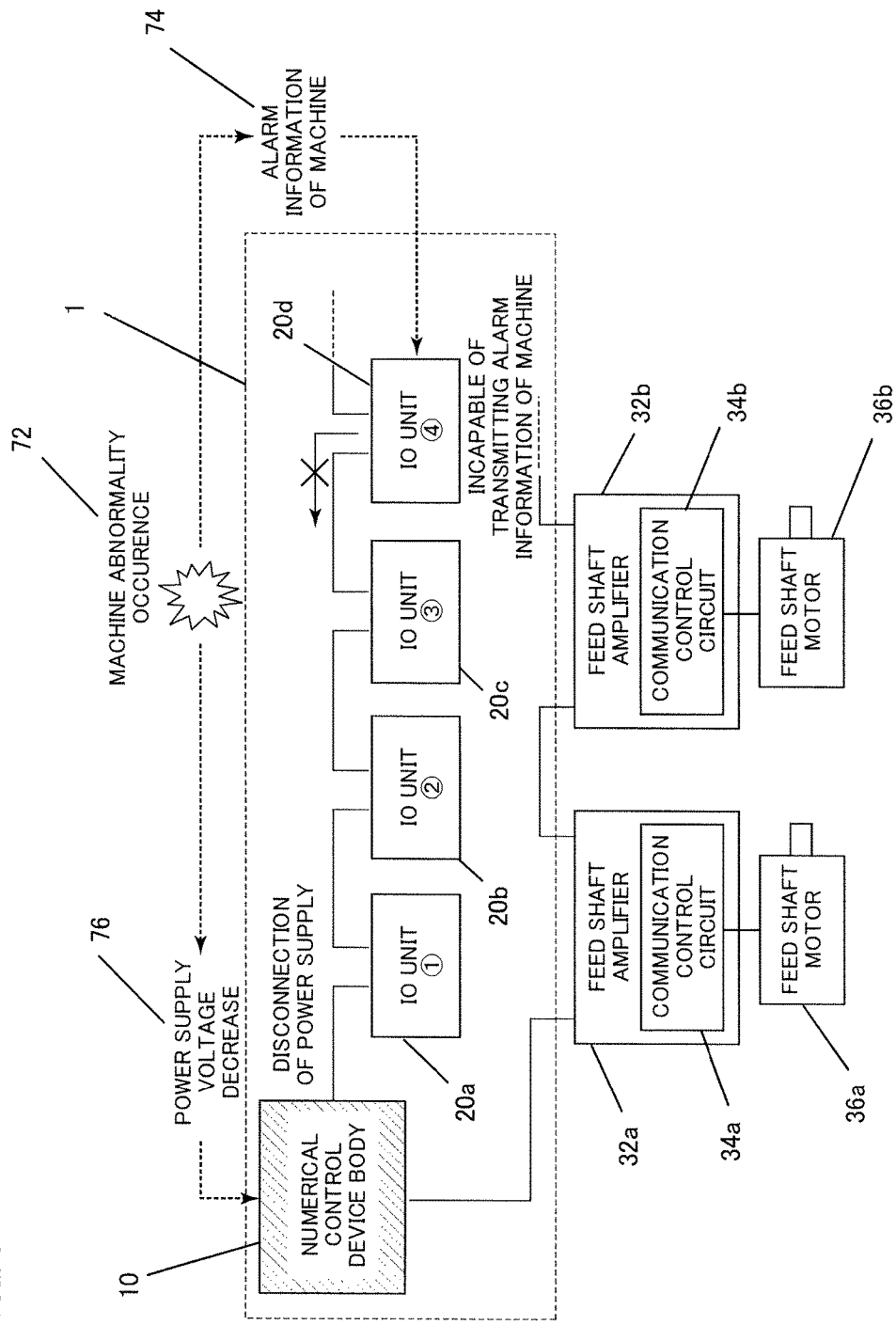
FIG. 6 is diagram illustrating a configuration of a numerical control device according to a second embodiment.

FIG. 6 is a diagram illustrating a configuration of the numerical control device according to the embodiment. In the embodiment, the numerical control device 1 is connected to an external machine. The embodiment is different from the first embodiment in that, when abnormality occurs in the machine, a specific IO unit (in the embodiment, the IO unit 4 (20d)) transmits information indicating that abnormality occurs in the machine. In addition, 72 indicates a machine abnormality occurrence signal; 74 indicates alarm information of a machine; and 76 indicates a power supply voltage decrease signal.

Figure 7:
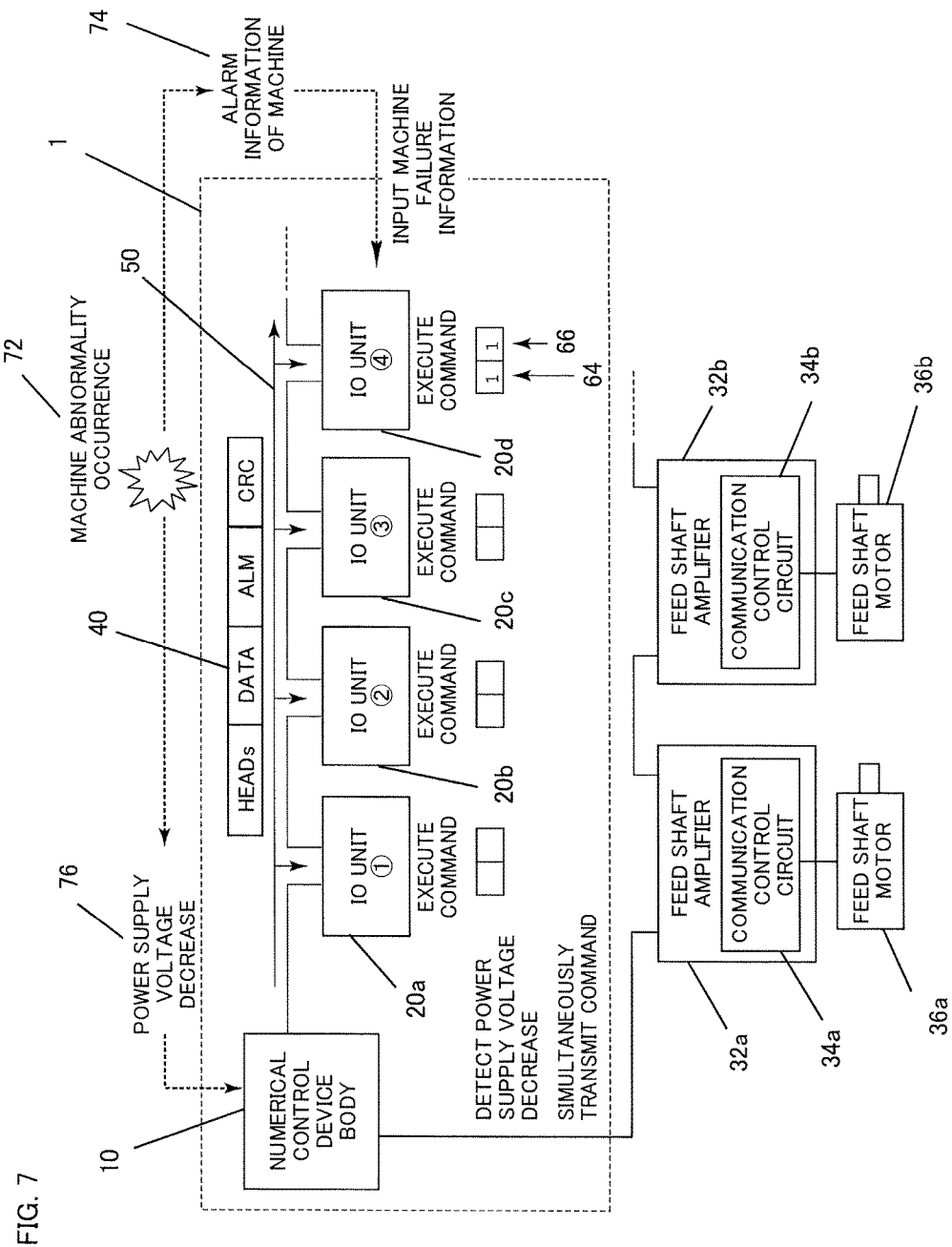
FIG. 7 is diagram illustrating a state where a numerical control device body transmits a command simultaneously in the second embodiment.
Figure 8:
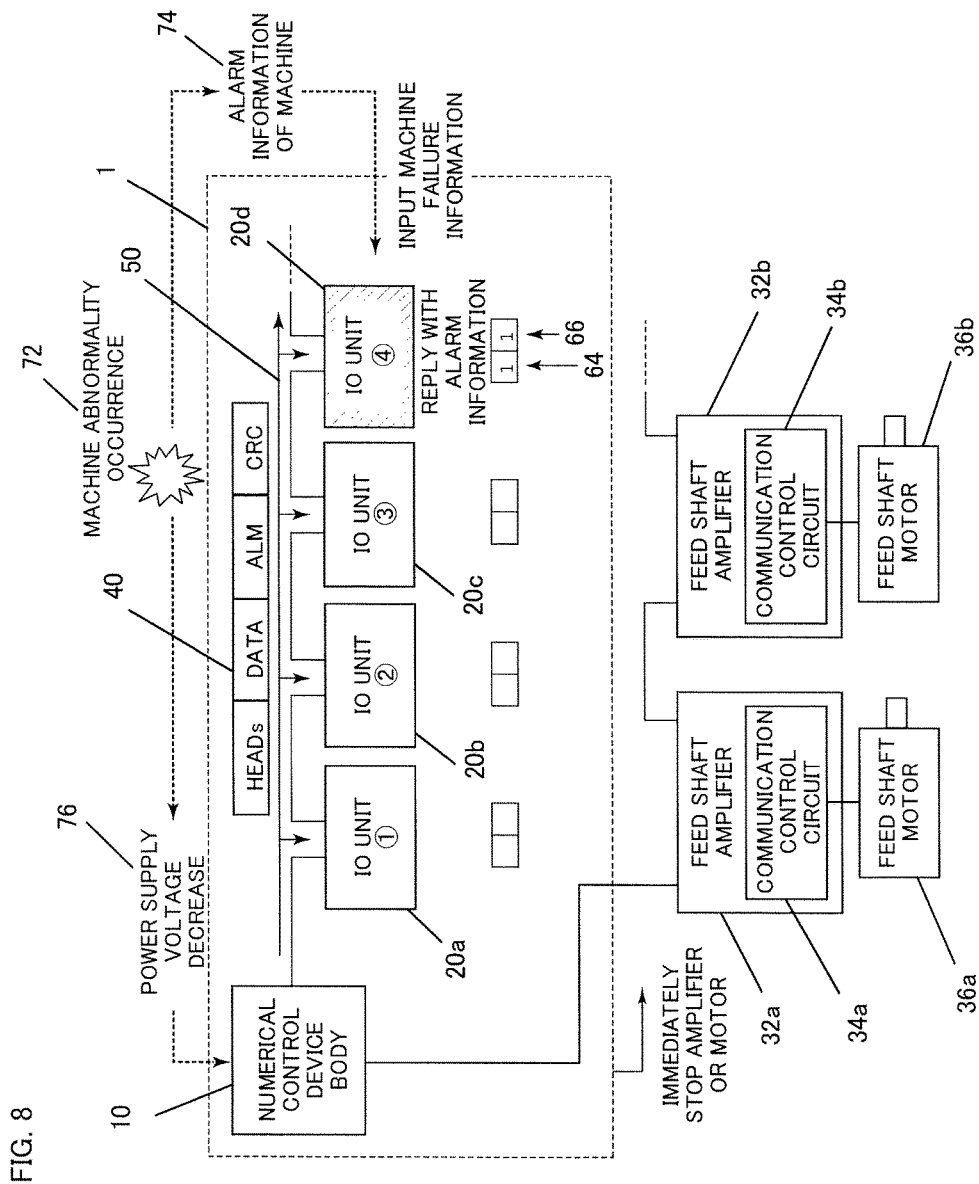
FIG. 8 is a diagram illustrating a state where an IO unit where alarm occurs makes a reply to the numerical control device body in the second embodiment.

FIG. 7 is a diagram illustrating a state where the numerical control device body 10 transmits the alarm search command 50 simultaneously to each IO unit 20 when abnormality occurs in the machine and the numerical control device body 10 detects a decrease in power supply voltage in the embodiment. FIG. 8 is a diagram illustrating a state where a specific IO unit 20 makes a reply to the numerical control device body 10.

In the IO unit (in the embodiment, the IO unit 4 (20d)) having the alarm information of the machine, the information of the machine is set as one of the alarm information registers 62, and both of the enable bit 64 and the alarm bit 66 of the alarm information register 62 where the information of the machine is set in advance are set to 1. If the abnormality occurs in the machine and the numerical control device body 10 detects a decrease in power supply voltage, as illustrated in FIG. 7, the numerical control device body 10 transmits the alarm search command 50 simultaneously to each IO unit 20.

In the IO unit 4 (20d), since the information of the machine is set in one of the alarm information registers 62 in advance and both of the enable bit 64 and the alarm bit 66 are set to 1, the IO unit 4 (20d) may make a reply to the numerical control device body 10 with the alarm information. Accordingly, until the power supply of the numerical control device body 10 is completely disconnected, the information from the IO unit 20 is acquired, so that it is possible to immediately stop the operation of the amplifier or the motor, and it is possible to use the information of the IO unit 20 to repair the machine.

In the embodiment, in the specific IO unit 20, the information of the machine is set in one of the alarm information registers 62 and both of the enable bit 64 and the alarm bit 66 of the alarm information register 62 are set to 1 in advance. However, alternatively, only the enable bit 64 of the alarm information register 62 where the information of the machine is set may be set to 1, and when the alarm information of the machine is input, the alarm bit 66 is set to 1, so that it may be possible to make a reply to the numerical control device body 10 with the alarm information where both of the enable bit 64 and the alarm bit 66 are set to 1.

Third Embodiment

In the first or second embodiment, in a case where the communication abnormality in the communication between the numerical control device body 10 and the IO unit 20 or the abnormality of the machine connected to the numerical control device 1 occurs, the numerical control device body 10 transmits the alarm search command 50 simultaneously to each IO unit 20. Herein, the simultaneous transmission of the command from the numerical control device body 10 to each IO unit 20 may be performed for the other purposes as well as at the time of occurrence of the abnormality. As an example, there are the case of simultaneously turning DOs of all the IO units 20 ON/OFF, the case of simultaneously clearing the alarm information of all the IO units 20, and the case of simultaneously transmitting position information of the motor controlled by the numerical control device body 10 to all the IO units 20.

In these cases, at the time of simultaneous transmission from the numerical control device body 10, since the numerical control device body 10 transmits the command to all the IO units 20, the individual IO unit 20 does not make a reply to the numerical control device body 10 with respect to the received command.

On the other hand, in general, in some cases, in the communication between the numerical control device body 10 and the IO unit 20 which are exposed to strong noise environment under an FA environment, abnormality may occur in the communication data due to the strong noise, and the communication data from the numerical control device body 10 to the IO unit 20 may not be normally received. Therefore, a unit where the numerical control device body 10 checks whether or not the individual IO unit 20 can receive the command simultaneously transmitted from the numerical control device body 10 may be needed.

Figure 9:
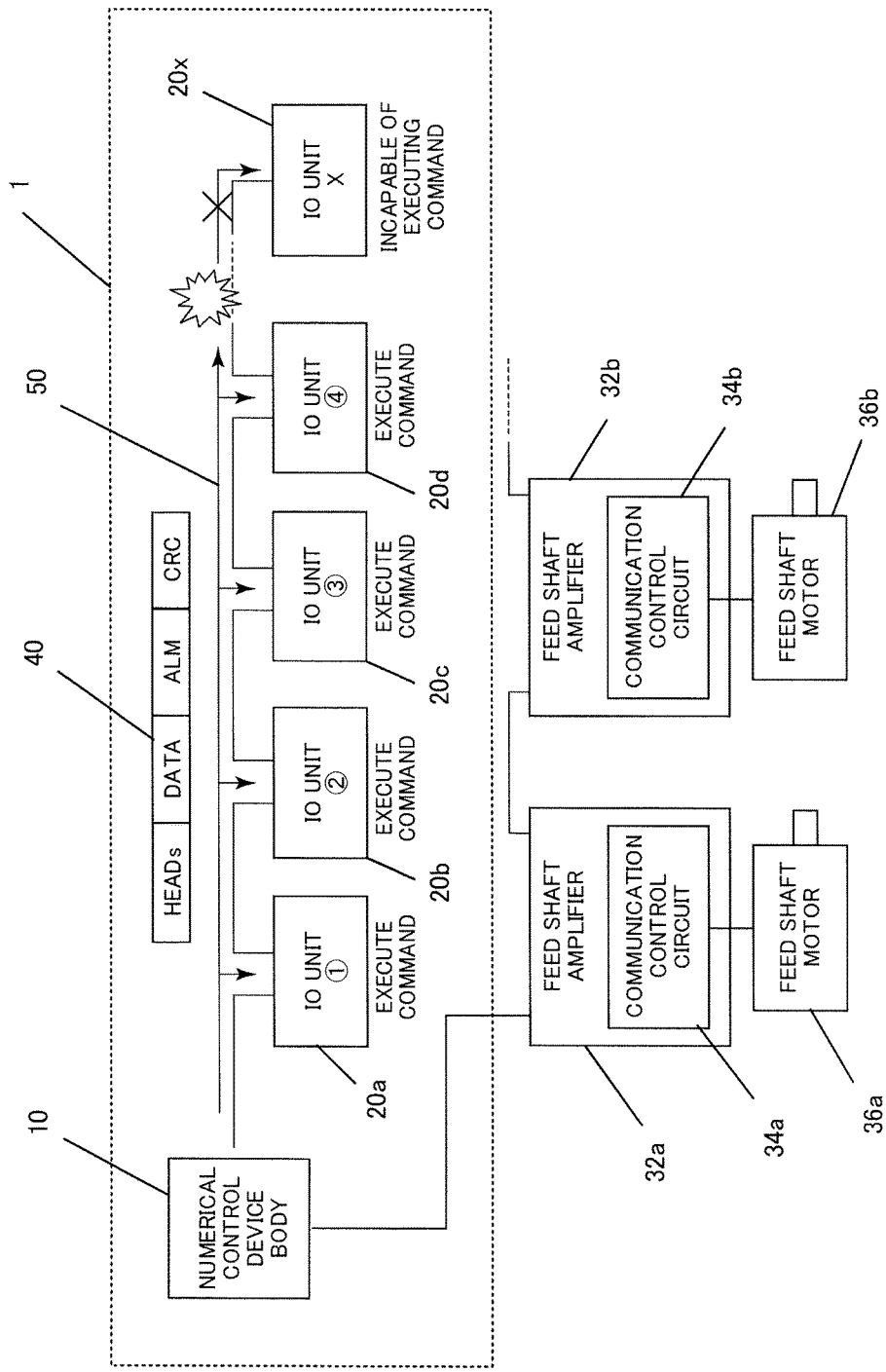
FIG. 9 is diagram illustrating a configuration of a numerical control device according to a third embodiment and a state where a numerical control device body transmits a command simultaneously.
Figure 10:
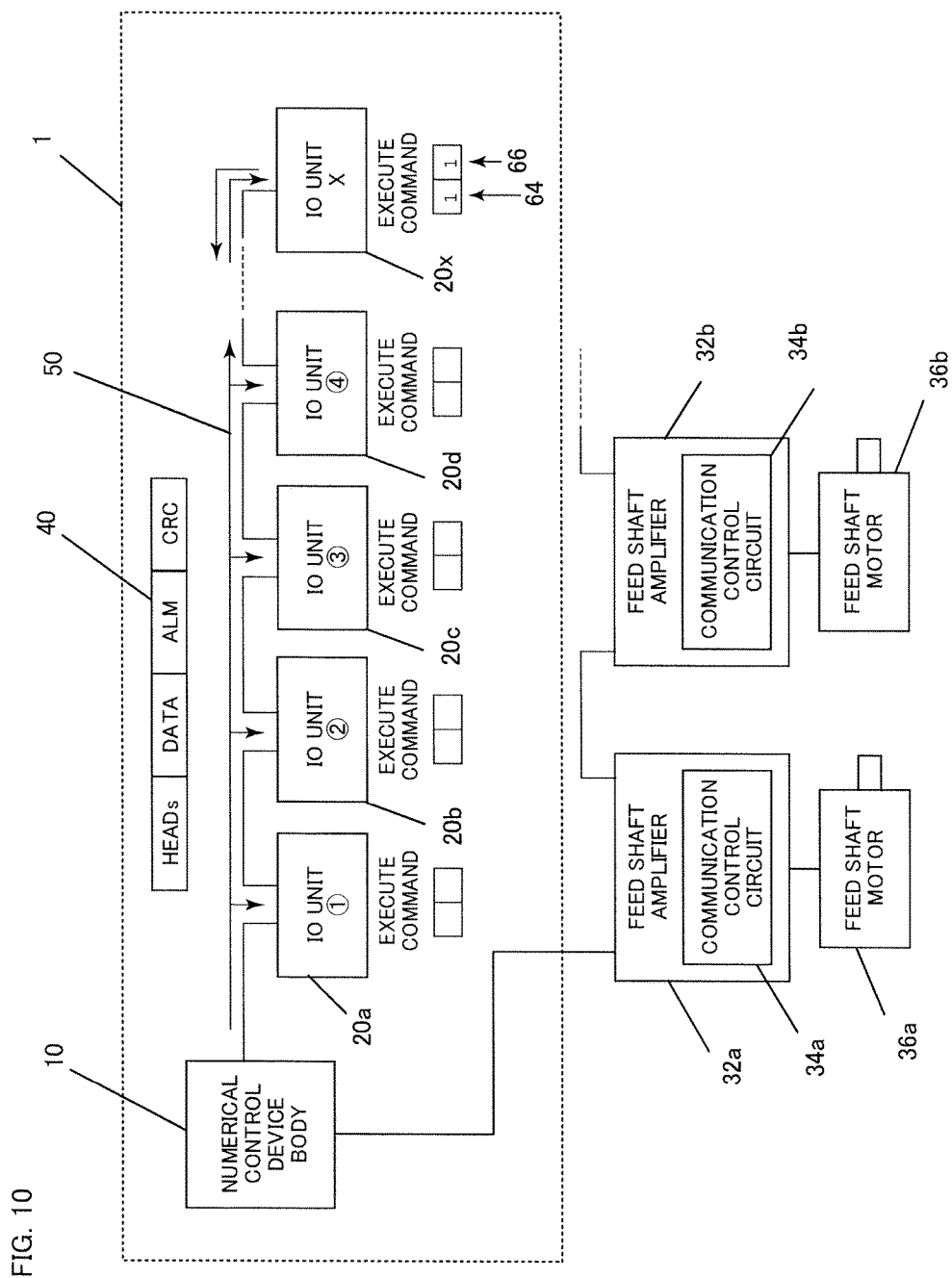
FIG. 10 is a diagram illustrating a state where an IO unit where alarm occurs makes a reply to the numerical control device body in the third embodiment.

FIG. 9 illustrates a configuration of the numerical control device according to the embodiment. FIG. 10 illustrates a state where the IO unit (IO unit X (20x) at the rear end makes a reply to the numerical control device body 10 when the data simultaneously transmitted from the numerical control device body can be normally received.

Among the IO units 20 connected in a daisy chain to the numerical control device body 10, in the IO unit 20 (IO unit X (20x)) connected at the rear end, the information on the communication abnormality from the numerical control device body 10 to each IO unit 20 is set to as one of the alarm information registers 62, and the enable bit 64 is set to 1 in advance so as to be valid. This bit becomes the bit which is considered to be valid to the specific command for the above-described simultaneously turning DOs ON/OFF, transmission of the position information of the motor, or the like.

In this state, if the numerical control device body 10 simultaneously transmits the specific command for simultaneously turning DOs ON/OFF, transmitting the position information of the motor, or the like to all the IO units 20, in a case where the data can be normally received, as illustrated in FIG. 10, only the IO unit (IO unit X (20x)) connected at the rear end makes a reply to the numerical control device body 10 with respect to the simultaneous transmission.

Like the embodiment, in a case where the IC units 20 are connected in a daisy chain, even at the time of transmitting the command simultaneously, since the command is transmitted through the IO unit 20 connected to the foregoing stage, it may be determined that the IO unit 20 (IO unit X (20x)) connected at the rear end normally receives the communication data. In a case where the numerical control device body 10 normally receives the reply from the IO unit 20 (IO unit X (20x)) connected at the rear end, it may be determined that all the IO units 20 including the IO units 20 which are passed on the way normally receive the command simultaneously transmitted from the numerical control device body 10.

The invention claimed is:

1. A numerical control device, which has a numerical control device body, and a plurality of IO units connected to the numerical control device body in a daisy chain, and configured to control a machine by performing IO communication between the numerical control device body and the IO units, and,
the numerical control device body comprising:
a communication abnormality detection unit configured to detect communication abnormality occurring in the IO communication between the numerical control device body and the IO units;
a command transmission unit configured to transmit a command simultaneously to all the IO units based on the detected communication abnormality;
an alarm acquisition unit, and,
each of the IO units comprising:
a status abnormality detection unit configured to detect at least one of incorrect data reception in the IO communication, power supply disconnection, communication line disconnection to the numerical control device body or another IO unit, and circuit abnormality of the IO unit itself as status abnormality;
a recording unit configured to record the status abnormality detected by the status abnormality detection unit as alarm information;
a command reply unit configured to make a reply with the alarm information with respect to the command from the numerical control device body, and,
the command transmission unit is configured to transmit a command requesting for making a reply to the numerical control device body with the alarm information recorded in the recording unit of each IO unit simultaneously to all the 10 units, when the communication abnormality detection unit detects the communication abnormality in the IO communication, and,
among the IO units, only the IO unit where the recording unit records the alarm information is configured to make a reply with the alarm information, and the alarm acquisition unit of the numerical control device body is configured to acquire the alarm information replied from the IO unit, when the command is transmitted simultaneously.

2. The numerical control device according to claim 1, the IO unit further comprising:

a storage unit configured to store a determination criterion for determining whether or not to record the detected status abnormality as the alarm information.

3. A numerical control device which has a numerical control device body and a plurality of IO units which are connected with the numerical control device body in a daisy chain and which performs control of a machine connected to the numerical control device body, and, the numerical control device body comprising:
a machine abnormality detection unit configured to detect abnormality occurring in the machine;
a command transmission unit configured to transmit a command simultaneously to all the IO units based on the detected abnormality in the machine, and, each of the IO units comprising:
an information acquisition unit configured to acquire alarm information when the abnormality of the machine is detected;
a recording unit configured to record the alarm information acquired by the information acquisition unit as the alarm information of the machine;
a command reply unit configured to make a reply with the alarm information with respect to the command from the numerical control device body, and, the command transmission unit is configured to transmit a command requesting for making a reply to the numerical control device body with the alarm information recorded in the recording unit of each IO unit simultaneously to all the IO units, when the machine abnormality detection unit detects the abnormality of the machine, and among the IO units, only the IO unit where the recording unit records the alarm information of the machine is configured to make a reply with the alarm information, and the alarm acquisition unit of the numerical control device body is configured to acquire the alarm information replied from the IO unit, when the command is transmitted simultaneously.

4. The numerical control device according to claim 3, the numerical control device body further comprising:

a setting unit configured to set the IO unit configured to acquire the alarm information of the machine.

5. A numerical control device which has a numerical control device body and a plurality of IO units which are connected to the numerical control device body in a daisy chain and which performs control of a machine, the numerical control device body is configured to include:
a command transmission unit configured to transmit a command simultaneously to all the IO units based on one of (i) a detected communication abnormality occurring between the numerical control device body and the IO units and (ii) a detected abnormality occurring in the machine;
a command reception unit configured to receive a command reply from the IO units with respect to the command, and, each of the IO units comprising:
an execution unit configured to execute the command with respect to the command from the numerical control device body;
a command reply unit configured to make a reply with respect to the command;
a setting unit configured to set whether or not to make a reply with respect to the command, and, the command transmission unit is configured to transmit a command requesting for executing at least one or more of turning DOs of the IO units ON or OFF, turning alarm of the IO unit OFF, and acquiring position information of a motor controlled by the numerical control device body simultaneously to all the IO units, and among the IO units, only the IO unit which is set by the setting unit in advance is configured to make a reply with respect to the command, and the command reception unit of the numerical control device body is configured to receive a command reply from the IO unit, when the command is transmitted simultaneously.

* * * * *